United States Patent
Hanaoka et al.

(10) Patent No.: US 12,009,670 B2
(45) Date of Patent: Jun. 11, 2024

(54) POWER MANAGEMENT APPARATUS, PRIORITY CONTROL METHOD AND PROGRAM

(71) Applicant: Nippon Telegraph and Telephone Corporation, Tokyo (JP)

(72) Inventors: Naoki Hanaoka, Musashino (JP); Toshihiro Hayashi, Musashino (JP); Hidetoshi Takada, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 78 days.

(21) Appl. No.: 17/799,046

(22) PCT Filed: Feb. 12, 2020

(86) PCT No.: PCT/JP2020/005383
§ 371 (c)(1),
(2) Date: Aug. 11, 2022

(87) PCT Pub. No.: WO2021/161424
PCT Pub. Date: Aug. 19, 2021

(65) Prior Publication Data
US 2023/0068669 A1    Mar. 2, 2023

(51) Int. Cl.
*H02J 3/46*    (2006.01)
*H02J 3/38*    (2006.01)

(52) U.S. Cl.
CPC ............... *H02J 3/46* (2013.01); *H02J 3/381* (2013.01); *H02J 2300/24* (2020.01)

(58) Field of Classification Search
CPC .......... H02J 3/46; H02J 3/381; H02J 2300/24
USPC .......................................................... 307/21
See application file for complete search history.

(56) References Cited

FOREIGN PATENT DOCUMENTS

| JP | 2010178504 A | * | 8/2010 |
| JP | 2013143892 A | * | 7/2013 |
| JP | 2017063554 A | * | 3/2017 |

(Continued)

OTHER PUBLICATIONS

JP 2010-178504, English translation, Espacenet, Dec. 21, 2023. (Year: 2010).*

(Continued)

*Primary Examiner* — Hal Kaplan
(74) *Attorney, Agent, or Firm* — Fish & Richardson P.C.

(57) ABSTRACT

Provided is a power management apparatus for determining an order of priority with respect to power supply to a consuming device at a target location in a power system that includes a plurality of locations between which power can be interchanged, the target location including at least the consuming device, a power generation unit that generates power from natural energy, a power storage unit, and a commercial power source. The power management apparatus includes a determination unit for determining an order of priority among a plurality of controlled objects including at least power supply from the power generation unit, power supply from the power storage unit, power supply from the commercial power source, and power consumption reduction by transferring a load from the consuming device, and a priority setting unit for setting the order of priority that has been determined by the determination unit for the target location.

7 Claims, 9 Drawing Sheets

(56) References Cited

FOREIGN PATENT DOCUMENTS

JP          2019161706 A  *  9/2019  ........... C07C 323/31

OTHER PUBLICATIONS

JP 2013-143892, English translation, Espacenet, Dec. 21, 2023. (Year: 2013).*
JP 2017-63554, English translation, Espacenet, Dec. 21, 2023. (Year: 2017).*
JP 2019-161706, English translation, Espacenet, Dec. 21, 2023. (Year: 2019).*
[No Author Listed] [online], "Sakura Internet Opens Solar Power Plant in Ishikari City, Hokkaido—Challenge to utilize renewable energy at Ishikari Data Center," sakura.ad.jp, Aug. 10, 2015, retrieved from URL <https://www.sakura.ad.jp/information/wp-content/uploads/2017/10/20150810_photovoltaic.pdf>, 5 pages (with English Translation).

* cited by examiner

Fig. 5

| PRIORITY MAP | | ORDER OF PRIORITY BASED ON EACH AXIS | | | |
|---|---|---|---|---|---|
| ID | CONTROLLED OBJECT | COST | LOSS | BCP | EV |
| A | POWER GENERATION UNIT | | | | |
| B | LOAD TRANSFER | | | | |
| C | STORAGE BATTERY DISCHARGE (EV) | | | | |
| D | POWER DISTRIBUTION FROM ANOTHER LOCATION | | | | |
| E | COMMERCIAL POWER | | | | |

POWER MANAGEMENT APPARATUS, PRIORITY CONTROL METHOD AND PROGRAM

CROSS-REFERENCE TO RELATED APPLICATIONS

This application is a National Stage application under 35 U.S.C. § 371 of International Application No. PCT/JP2020/005383, having an International Filing Date of Feb. 12, 2020, the disclosure of which is considered part of the disclosure of this application, and is incorporated by reference in its entirety into this application.

TECHNICAL FIELD

The present invention relates to a priority control technology for power supply to consuming devices.

BACKGROUND ART

At locations such as data centers and telecommunication buildings, power is received from a commercial power source through a power distribution grid and supplied to a consuming device, and in addition to this, often a power generation unit for power generation from natural energy, such as photovoltaics (PV), is provided and power generated by the power generation unit is used. Moreover, a power storage unit (storage battery) is also often provided in order to prepare for a disaster and the like.

As an example configuration of such location, NPL 1 discloses a high voltage direct current (HVDC) power supply system that supplies DC power to a server without converting it to AC power. In this power supply system, priority control is performed such that power is supplied from a power generation unit while the power generation unit is generating power, but if the power generation unit stops generating power, power is supplied from a commercial power source, and in the event of a power outage, power is supplied from a power storage unit.

CITATION LIST

Non Patent Literature

[NPL 1] SAKURA Internet Inc., Ishikari data center: press release (Aug. 10, 2015) https://www.sakura.ad.jp/information/wp-content/uploads/2017/10/20150810_photovoltaic.pdf

SUMMARY OF THE INVENTION

Technical Problem

A technology for interchanging power between a plurality of locations by connecting the locations via privately-owned power lines (a power grid prepared separately from an AC power distribution grid) has recently been proposed.

Priority control using the conventional technology disclosed in NPL 1 can realize a high power efficiency within a location; however, the conventional technology is designed to be applied within a single location only, and effective priority control for a power system capable of power interchange between a plurality of locations has not been proposed.

The present invention was made with the foregoing in view, and it is an object thereof to provide a technology for performing priority control in a power system capable of power interchange between a plurality of locations.

Means for Solving the Problem

According to the technology disclosed herein, there is provided a power management apparatus for determining an order of priority with respect to power supply to a consuming device at a target location in a power system that includes a plurality of locations between which power can be interchanged, the target location including at least the consuming device, a power generation unit that generates power from natural energy, a power storage unit, and a commercial power source, the power management apparatus including:

a determination unit for determining, based on a predetermined evaluation axis, an order of priority among a plurality of controlled objects including at least power supply from the power generation unit, power supply from the power storage unit, power supply from the commercial power source, and power consumption reduction by transferring a load from the consuming device; and a priority setting unit for setting the order of priority that has been determined by the determination unit for the target location.

Effects of the Invention

According to the technology disclosed herein, there is provided a technology for performing priority control in a power system capable of power interchange between a plurality of locations.

BRIEF DESCRIPTION OF DRAWINGS

FIG. 5 shows an example of a priority map.

DESCRIPTION OF EMBODIMENTS

Hereinafter, an embodiment of the present invention will be described with reference to the drawings. The embodiment that will be described below is merely an example, and embodiments to which the present invention is applicable are not limited to the following embodiment.

Overview of System Configuration and Control Content

Figure 1:
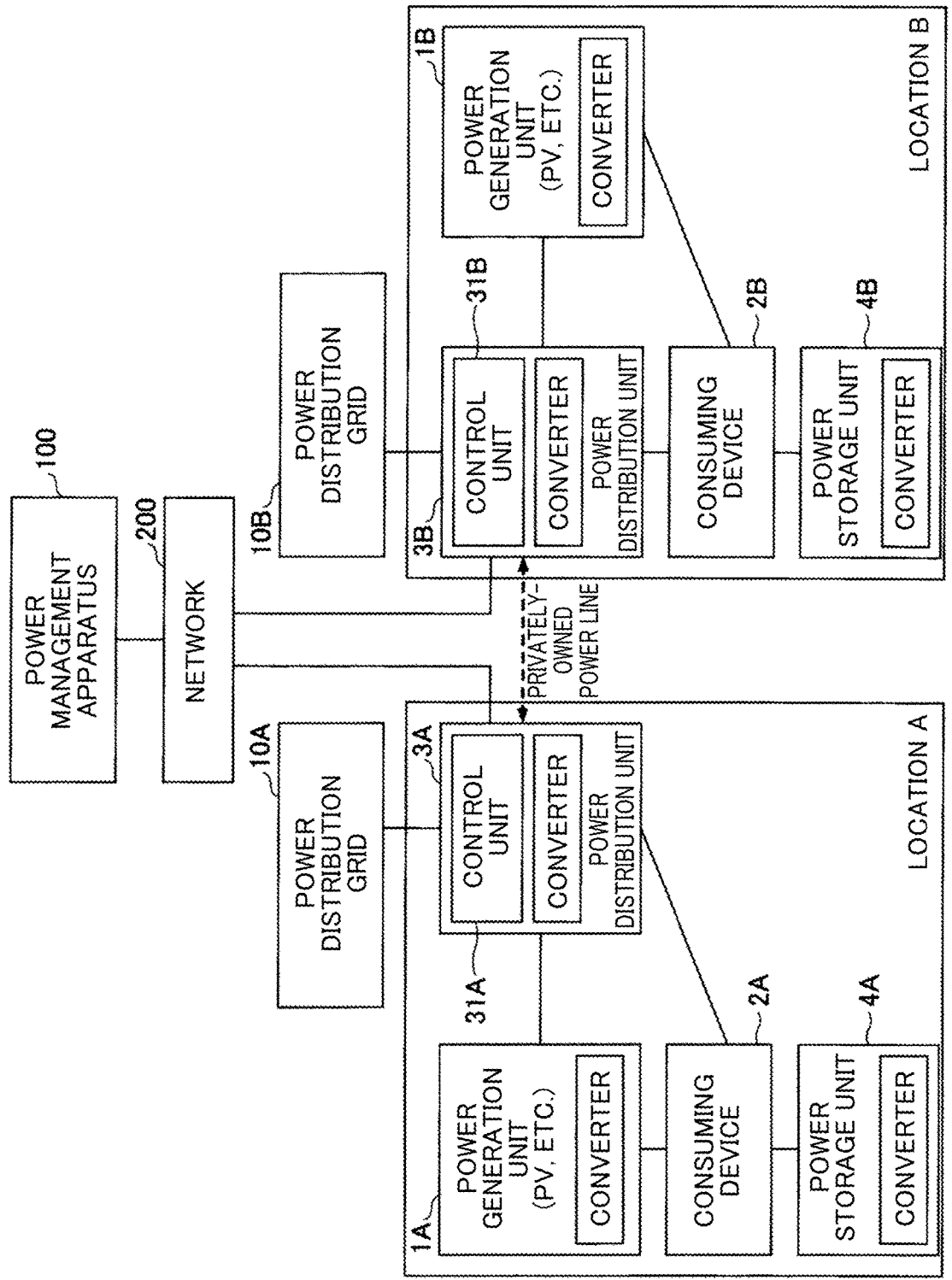
FIG. 1 is a diagram showing a system configuration of an embodiment of the present invention.

FIG. 1 shows an example configuration of a power system of the present embodiment. As shown in FIG. 1, the present power system has a configuration in which a location A and a location B are connected to each other via a privately-owned power line.

Here, each location is assumed to be a building such as a telecommunication building or a data center, but this assumption is for illustrative purposes only. The "location" may be smaller than a building (e.g., a single floor, a single room, or the like), or may be larger than a building (e.g., a group of buildings, a town, a city, a prefecture, a region, or the like).

As shown in FIG. 1, the location A includes a power generation unit 1A that generates power from natural energy such as sunlight, a consuming device 2A constituting a load that consumes power, a power storage unit 4A constituted by a storage battery that stores power, and a power distribution unit 3A connected to a power distribution grid 10A provided by an electric power company or the like. The power storage unit 4A may be an EV (electric vehicle), or an EV may be connected in addition to the power storage unit 4A.

The power generation unit 1A and the power storage unit 4A include respective DC/DC converters (hereinafter referred to as "converters"), and the output voltages of the power generation unit 1A and the power storage unit 4A can be set as desired. Moreover, the power distribution unit 3A that receives commercial power includes a rectifier and a converter, and the output voltage of commercial power converted to DC by the converter can be set as desired. Note that a section (rectifier+converter) that receives commercial power from an AC power distribution grid 10 and supplies it to a destination within the location may be referred to as a "commercial power source".

Note that, as the converters, a converter may be used that sets an output current and automatically controls the voltage so as to achieve the set current value.

The consuming device 2A may be a network device such as a router, a server that processes data, or the like, for example. The consuming device 2A may also be a server on which a virtual machine runs. The location B has a similar configuration to that of the location A.

The power distribution unit 3A can receive power (commercial power) supplied from the power distribution grid 10A and supply the received power to the consuming device 2A and the power storage unit 4A. Moreover, for example, when the amount of power generated by the power generation unit 1A is greater than the amount of power consumed by the consuming device 2A, the power distribution unit 3A can also distribute the surplus power to the power distribution grid 10A. Conversely, the power distribution unit 3A can receive power supplied from another location (e.g., the location B) and supply the received power to the consuming device 2A and the power storage unit 4A. Supplying power from one location to another location can also be said as "interchanging" power.

Furthermore, transferring the load on the consuming device 2A to another location (the location B) (e.g., transferring a virtual machine to a consuming device 2B) is also an example of interchanging power from another location to the location A.

As shown in FIG. 1, a power management apparatus 100 is provided. The power distribution unit 3A at the location A has a control unit 31A constituted by a voltmeter, an ammeter, an electric energy meter, a load control function, a converter setting function, and the like, and the power distribution unit 3A having the control unit 31A is communicably connected to the power management apparatus 100 via a network 200. The same applies to the location B.

Note that, although FIG. 1 shows the locations A and B, there are actually more locations, which are each connected to the power management apparatus 100. Moreover, although the power management apparatus 100 in the example shown in FIG. 1 is provided outside the locations A and B, the power management apparatus 100 may be provided within one of the locations (e.g., within the location A). Furthermore, there may be a location that is not provided with a power generation unit.

The power management apparatus 100 determines the order of priority with respect to power supply to a consuming device, and performs control and setting for a location such that priority control of power supply is executed in that order of priority.

In the following description of the present embodiment, control at a certain location will be focused on. This location is referred to as a "target location". Similar control is performed at other locations as well. Also, objects subjected to priority control, such as the power generation unit 1A, the power storage unit 4B, and the load transfer, are referred to as "controlled objects". Hereinafter, for the sake of convenience, controlled objects are not denoted by reference numerals such as "1A".

More specifically, in the present embodiment, the power management apparatus 100 determines, at the target location, the order of priority among the power generation unit, load transfer (this may also be referred to as "load control"), the power storage unit, power distribution from another location, and commercial power. A specific example of the method for determining the order of priority will be described later. Note that the power storage unit may be an EV.

The above-mentioned load transfer means transferring the load on the consuming device to another location. For example, in the case where the consuming device is a server on which a virtual machine runs, the virtual machine is transferred to a consuming device at another location through migration. In addition, in the case where the consuming device is a router, it is also possible to transfer traffic to a consuming device at another location by network routing control.

As an example, it is assumed that the power generation unit, load transfer, the power storage unit, power distribution from another location, and commercial power are prioritized in descending order of priority. In this case, at the target location, power is first supplied from the power generation unit to the consuming device, and if the power from the power generation unit is insufficient, load transfer is performed.

If the power from the power generation unit is still insufficient even after the load transfer, then, power is supplied from the power storage unit to the consuming device. After the power storage unit has been discharged, power from another location is supplied to the consuming device. If power supply from the other location becomes unavailable, commercial power is then supplied to the consuming device.

On the other hand, for example, in the case where disaster backup is used as an evaluation axis, and importance is attached to charging of the power storage unit, the priority of power supply from the power storage unit in the above-described priority control can be lowered, and conversely, in the case where the state of charge of the power storage unit is below a predetermined state of charge, a high level (e.g., the highest level) of priority can be assigned to charging the power storage unit until the predetermined state of charge is reached. In this case, the power storage unit may be charged from the power generation unit, may be charged with power distributed from another location, or may be charged with commercial power. Also, the power supply source for this charging may be determined based on an evaluation axis that will be described later. That is to say, when charging a storage battery, the order of priority, which will be described later, can be determined with the storage battery being regarded as a consuming device.

The power management apparatus 100 can determine the order of priority based on each evaluation criteria (evaluation axis). Examples of the evaluation axis include cost, loss, BCP (business continuity plan), and EV. BCP may also be called as "disaster backup". EV, too, may also be called as "disaster backup". Examples of the order of priority determined based on each evaluation axis are as follows.

In the case where cost is selected as the evaluation axis, the power generation unit, which avoids the necessity of purchasing power, is given the highest level of priority, and the commercial power is given the lowest level of priority. For power supply sources other than the commercial power and the power generation unit, the order of priority is determined by comparing the power supply sources in terms of cost with consideration given to distribution loss and the like.

In the case where loss is selected as the evaluation axis, power from another location, which involves high distribution loss, is given the lowest level of priority. For power supply sources other than the other location, the order of priority is determined by comparing the power supply sources in terms of loss constituted by wiring loss, conversion loss, and the like.

With regard to BCP, the highest level of priority is given to ensuring that the power storage unit is in a fully charged state (an example of the predetermined state of charge) in the event of a disaster or the like. Therefore, as for the order of priority among the power supply sources for supplying power to the consuming device, the power storage unit is given the lowest level of priority. For the power supply sources other than the power storage unit, the order of priority can be determined using cost or loss as the evaluation axis.

During the evaluation, if a location that can supply power to the target location even when commercial power stops due to a disaster or the like is present as another location, the priority of "power distribution from another location" may be elevated.

With regard to EV, similarly to BCP, the highest level of priority is given to ensuring that an EV is in a fully charged state (an example of the predetermined state of charge) in the event of a disaster or the like. Therefore, as for the order of priority among the power supply sources for supplying power to the consuming device, EV is given the lowest level of priority. For the power supply sources other than the power storage unit, the order of priority can be determined using cost or loss as the evaluation axis.

Hereinafter, an apparatus configuration and a processing procedure will be described in greater detail.

Apparatus Configuration

Figure 2:
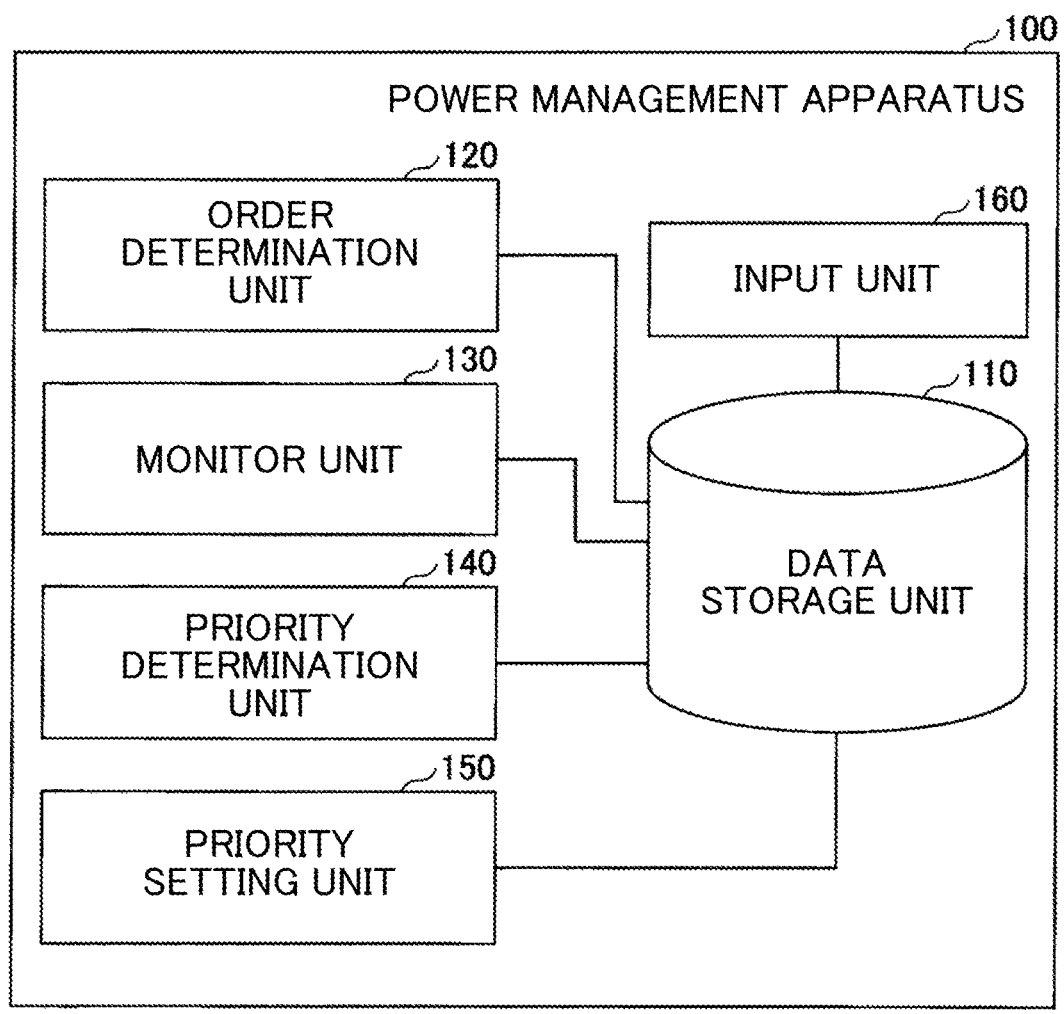
FIG. 2 is a diagram showing a functional configuration of a power management apparatus.

FIG. 2 is a diagram showing a functional configuration of the power management apparatus 100. As shown in FIG. 2, the power management apparatus 100 includes a data storage unit 110, an order determination unit 120, a monitor unit 130, a priority determination unit 140, a priority setting unit 150, and an input unit 160. Note that the order determination unit 120 and the priority determination unit 140 may be collectively referred to as a "determination unit".

The data storage unit 110 stores data that is necessary for determining the order of judgment, such as electric energy rates, distribution loss, conversion loss, and the like. Data that is necessary for determining the order of judgment is stored in advance. Furthermore, the data storage unit 110 stores information obtained from the monitor unit 130 (surplus power status of other locations when viewed from the target location, information regarding the availability of load transfer, charge status of the power storage unit, and the like). The information obtained from the monitor unit 130 is real-time information and is sequentially updated.

The monitor unit 130 acquires, from each location, surplus power information (information indicating whether or not power interchange is available), traffic volume (information indicating the availability of load transfer), charge status of the power storage unit, and the like and stores the acquired information in the data storage unit 110. Note that the traffic volume may be acquired from a network monitoring apparatus or the like.

The priority determination unit 140 determines the order of priority with respect to the individual controlled objects in the order determined by the order determination unit 120. The priority setting unit 150 sets the order of priority for the target location so that control is performed according to the order of priority determined by the priority determination unit 140. The input unit 160 performs data input.

Example Hardware Configuration

The power management apparatus 100 can be realized by, for example, causing a computer to execute a program that describes the processing content illustrated in the present embodiment. Note that the "computer" may be a virtual machine in the cloud. In the case where a virtual machine is used, the "hardware" described here is virtual hardware.

The program can be saved and distributed by being recorded on a computer-readable recording medium (portable memory, etc.). The program can also be provided through a network such as the Internet or email.

Figure 3:
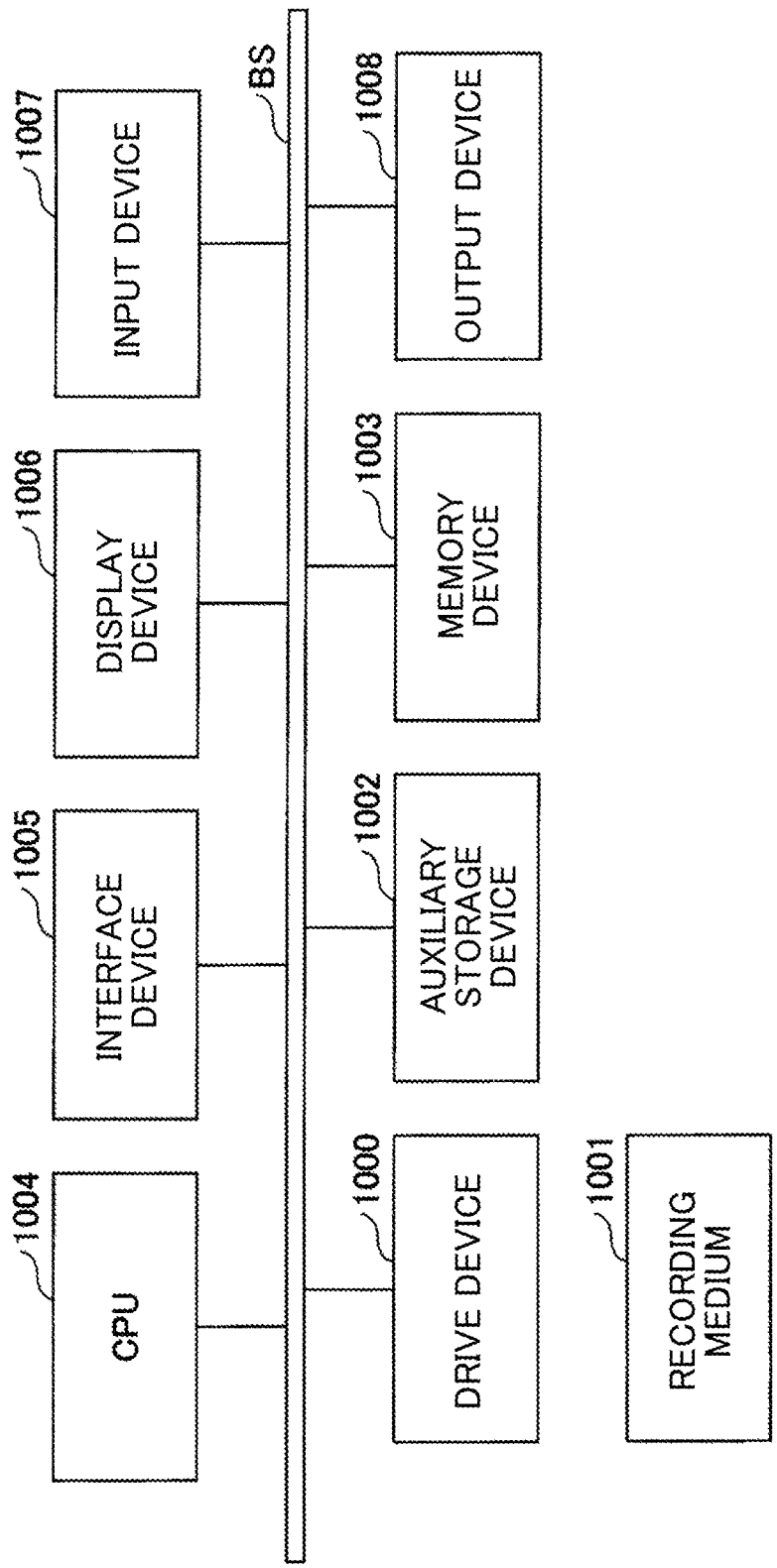
FIG. 3 is a diagram showing an example hardware configuration of the apparatus.

FIG. 3 is a diagram showing an example hardware configuration of the computer. The computer in FIG. 3 has a drive device 1000, an auxiliary storage device 1002, a memory device 1003, a CPU 1004, an interface device 1005, a display device 1006, an input device 1007, an output device 1008, and the like that are connected to each other by a bus BS.

A program for realizing the processing of the computer is provided by a recording medium 1001 such as a CD-ROM or a memory card, for example. When the recording medium 1001 storing the program is set in the drive device 1000, the program is installed onto the auxiliary storage device 1002 from the recording medium 1001 via the drive device 1000. However, the program does not necessarily need to be installed from the recording medium 1001, and may be downloaded from another computer via a network. The auxiliary storage device 1002 stores necessary files, data, and the like, together with storing the installed program.

The memory device 1003 reads out and stores the program from the auxiliary storage device 1002, if there is a program activation instruction. The CPU 1004 realizes the functions related to the power management apparatus 100, in accordance with the program stored in the memory device 1003. The interface device 1005 is used as an interface for connecting to a network. The display device 1006 displays a GUI (graphical user interface) of the program, and the like.

The input device 1007 is constituted by a keyboard and a mouse, buttons, a touch panel, or the like, and is used in order to allow input of various operating instructions. The output device 1008 outputs calculation results and the like.

Example Operation of Power Management Apparatus 100

Next, an example operation of the power management apparatus 100 will be described with reference to a flowchart in FIG. 4. In S101, an evaluation axis for performing evaluation and controlled objects (here, power generation unit, load transfer, power storage unit, another location, and commercial power) to be prioritized are input by the input unit 160 of the power management apparatus 100.

In addition, in the case where priority control of power supply within the location is performed in such a manner as to supply power to the consuming device in descending order of magnitude of the output voltages of the converters, output voltages (voltages to be set for respective converters) of the controlled objects are also input. On the other hand, in the case where priority control of power supply within the location is performed in such a manner as to supply power to the consuming device in descending order of magnitude of the output currents of the converters, output currents (currents to be set for respective converters) of the controlled objects are input.

As the evaluation axis for performing evaluation, a single evaluation axis may be used, or a plurality of evaluation axes may be used. In the present example, it is assumed that evaluation is performed based on "cost", "loss", "BCP", and "EV".

Based on the input information above, a priority map such as that shown in FIG. 5 is generated by the input unit 160 and stored in the data storage unit 110. Hereinafter, IDs (A to E) shown in the priority map are used for the respective controlled objects (power supply sources).

Figure 4:
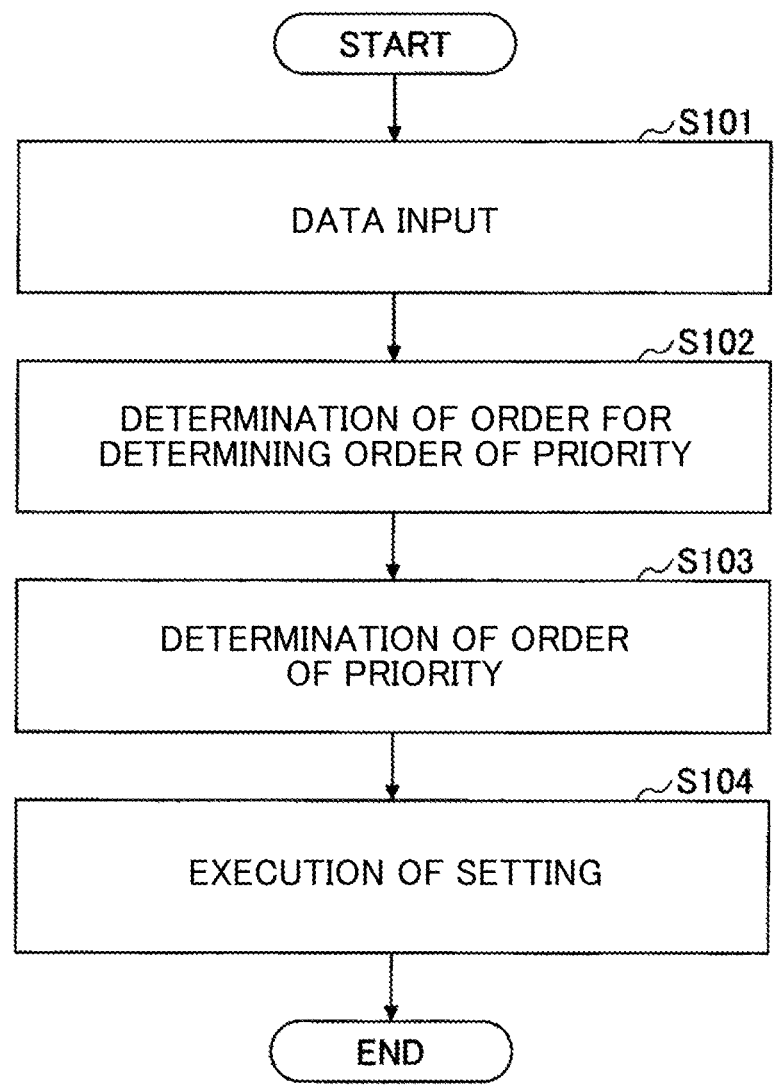
FIG. 4 is a flowchart illustrating processing that is performed by the power management apparatus.

S102 of FIG. 4: Determination of Order for Determining Order of Priority In S102, the order determination unit 120 determines the order in which processing for determining the order of priority with respect to the individual controlled objects is performed.

In the case where cost is used as the evaluation axis, the order determination unit 120 calculates the electric energy rate (yen/kWh) for each of the controlled objects A to E and determines the order such that the cheaper the price, the earlier in the order. Note that it is also possible that the electric energy rates of the respective controlled objects A to E are stored in the data storage unit 110 in advance, and the order determination unit 120 determines the order by referencing this data. As an example, the electric energy rates of the controlled objects are calculated as follows.

(1) Controlled Object A (Power Generation Unit)
  Electric energy rate=0 yen/kWh
(2) Controlled Object B (Load Transfer)
  Electricity energy rate at transfer destination location=18 yen/kWh
(3) Controlled Object C (Power Storage Unit)
  Cumulative electric energy rate for power stored in storage battery=21 yen/kWh
(4) Controlled Object D (Power Distribution from Another Location)
  Electric energy rate at another location+distribution cost=19 yen/kWh
(5) Controlled Object E (Commercial Power)
  Electric energy rate at target location=22 yen/kWh In the case of the above-described electric energy rate example, the order determination unit 120 determines the order of priority as follows: controlled object A→controlled object B→controlled object D→controlled object C→controlled object E. However, in the present embodiment, it is fixed in advance that the controlled object A (power generation unit) is of the highest priority, and therefore, determination of the order of priority in S103 is performed in the order of controlled object B→controlled object D→controlled object C→controlled object E.

In the case where loss is used as the evaluation axis, the smaller the loss with respect to a controlled object, the higher the priority of that controlled object. The loss includes conversion loss of the converters and intra-location distribution loss, and also includes inter-location distribution loss especially in the case of power distribution from another location.

In the case where BCP is used as the evaluation axis, priority is given to enabling power supply from the power storage unit in the event of a disaster. That is to say, in the context of power supply to the consuming device, the controlled object C (power storage unit) is given the lowest level of priority. In the case where EV is used as the evaluation axis as well, priority is given to enabling power supply from (the power storage unit (an EV)) in the event of a disaster. That is to say, in the context of power supply to the consuming device, the controlled object C (power storage unit (EV)) is given the lowest level of priority.

The order of priority among the controlled objects other than that of the lowest priority such as the power storage unit above is determined in a similar manner to that in the case of cost or loss. Moreover, with regard to charging of the power storage unit (or EV), the power storage unit (or EV) can be regarded as a consuming device, and the method for determining the order of priority among controlled objects for supplying power to a consuming device according to the present embodiment can be applied thereto.

S103 of FIG. 4: Determination of Order of Priority

In S103, the priority determination unit 140 determines the order of priority among the controlled objects. For example, the priority determination unit 140 performs priority determination processing (and priority setting processing) at regular time intervals. The reason for this is that the environment based on which the order of priority is determined changes over time.

As an example, it is assumed that it has been determined in S102 that determination of the order of priority is to be performed in the following order: controlled object B (load transfer)→controlled object D (power distribution from another location)→controlled object C (power storage unit)→controlled object E (commercial power). An example of priority determination processing that is performed in this case will be described with reference to flowcharts in FIGS. 6 to 9. Note that the controlled object A (power generation unit) is previously fixed to be of the highest priority (=Priority 1).

Figure 6:
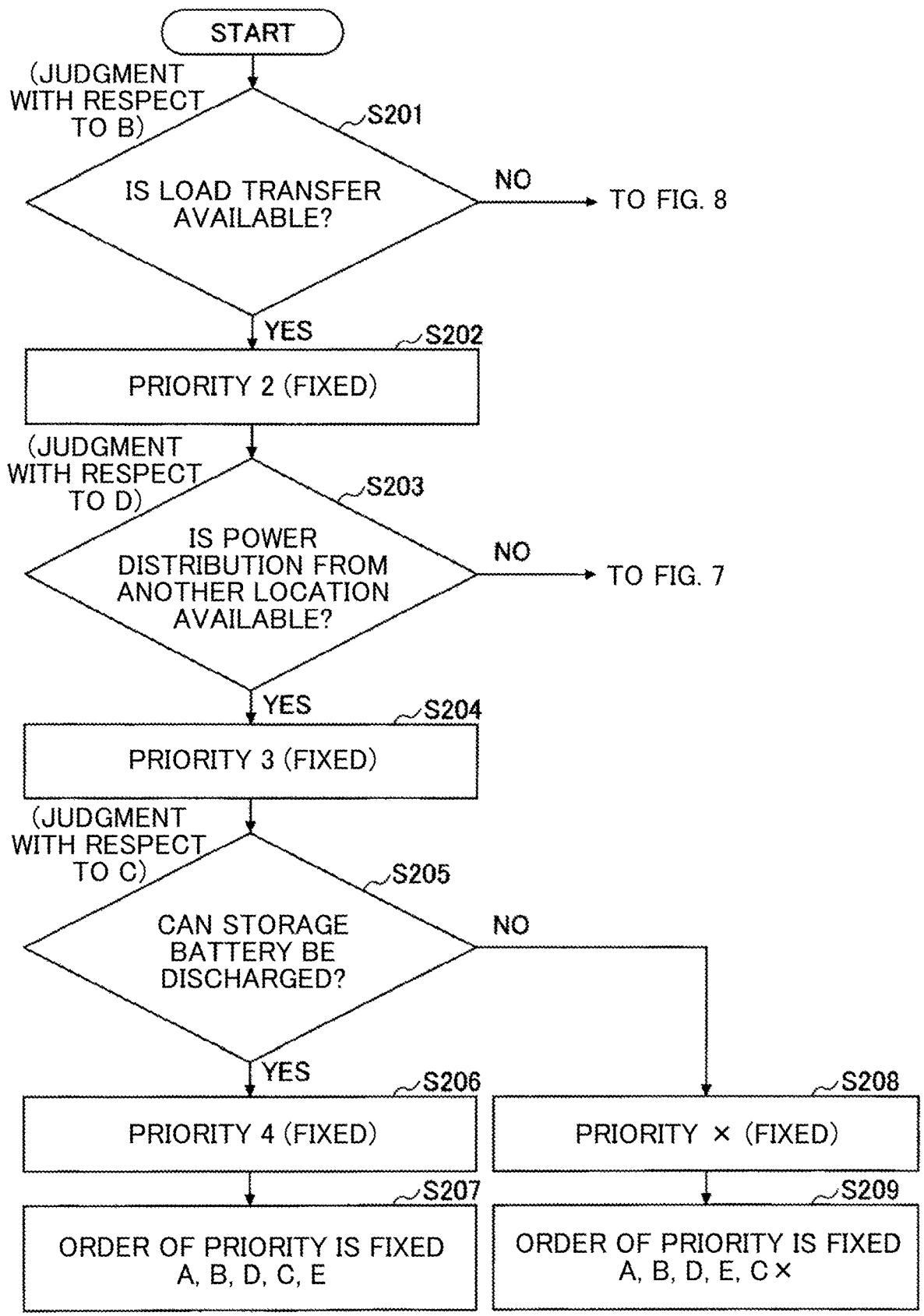
FIG. 6 shows an example of a flowchart for determining the order of priority.

In accordance with the above-described order, in S201 of FIG. 6, with respect to the controlled object B (load transfer), the priority determination unit 140 makes a judgment on whether or not the load can be transferred. For example, in the case where the consuming device is a server, if the monitor unit 130 detects that the throughput (CPU utilization) of a server at another location is low (e.g., at or below a predetermined threshold value), the priority determination unit 140 judges that the load on the consuming device at the target location can be transferred.

If the result of judgment in S201 is Yes, the processing proceeds to S202, and the priority determination unit 140 determines the priority of the controlled object B (load transfer) as Priority 2 (second priority).

In S203, with respect to the controlled object D (power distribution from another location), the priority determination unit 140 makes a judgment on whether or not power distribution from another location is available. For example, if the monitor unit 130 detects that a location having interchangeable surplus power is present among other locations that are connected to the target location through distribution lines (privately-owned power lines), the priority determination unit 140 judges that power distribution from another location is available.

If the result of judgment in S203 is Yes, the processing proceeds to S204, and the priority determination unit 140 determines the priority of the controlled object D (power distribution from another location) as Priority 3 (third priority).

In S205, with respect to the controlled object C (power storage unit), the priority determination unit 140 makes a judgment on whether or not the storage battery can be discharged. Specifically, for example, a judgment is made on whether the storage battery voltage of the power storage unit is not lower than a discharge cutoff voltage, or not lower than a set voltage at which discharge can be performed. The storage battery voltage value is acquired by the monitor unit 130.

If the result of judgment in S205 is Yes, the processing proceeds to S206, and the priority determination unit 140 determines the priority of the controlled object C (power storage unit) as Priority 4 (fourth priority). At this time, the priority of the controlled object E (commercial power) is fixed to be the lowest (Priority 5).

In S207, the order of priority "controlled object A (power generation unit)→controlled object B (load transfer)→controlled object D (power distribution from another location)→controlled object C (power storage unit)→controlled object E (commercial power)" is fixed.

If the result of judgment in S205 is No, the processing proceeds to S208, and the priority determination unit 140 determines that the controlled object C (power storage unit) will not be used (indicated as Priority x in the figure). In S209, the order of priority "controlled object A (power generation unit)→controlled object B (load transfer)→controlled object D (power distribution from another location)→controlled object E (commercial power)" is fixed.

Figure 7:
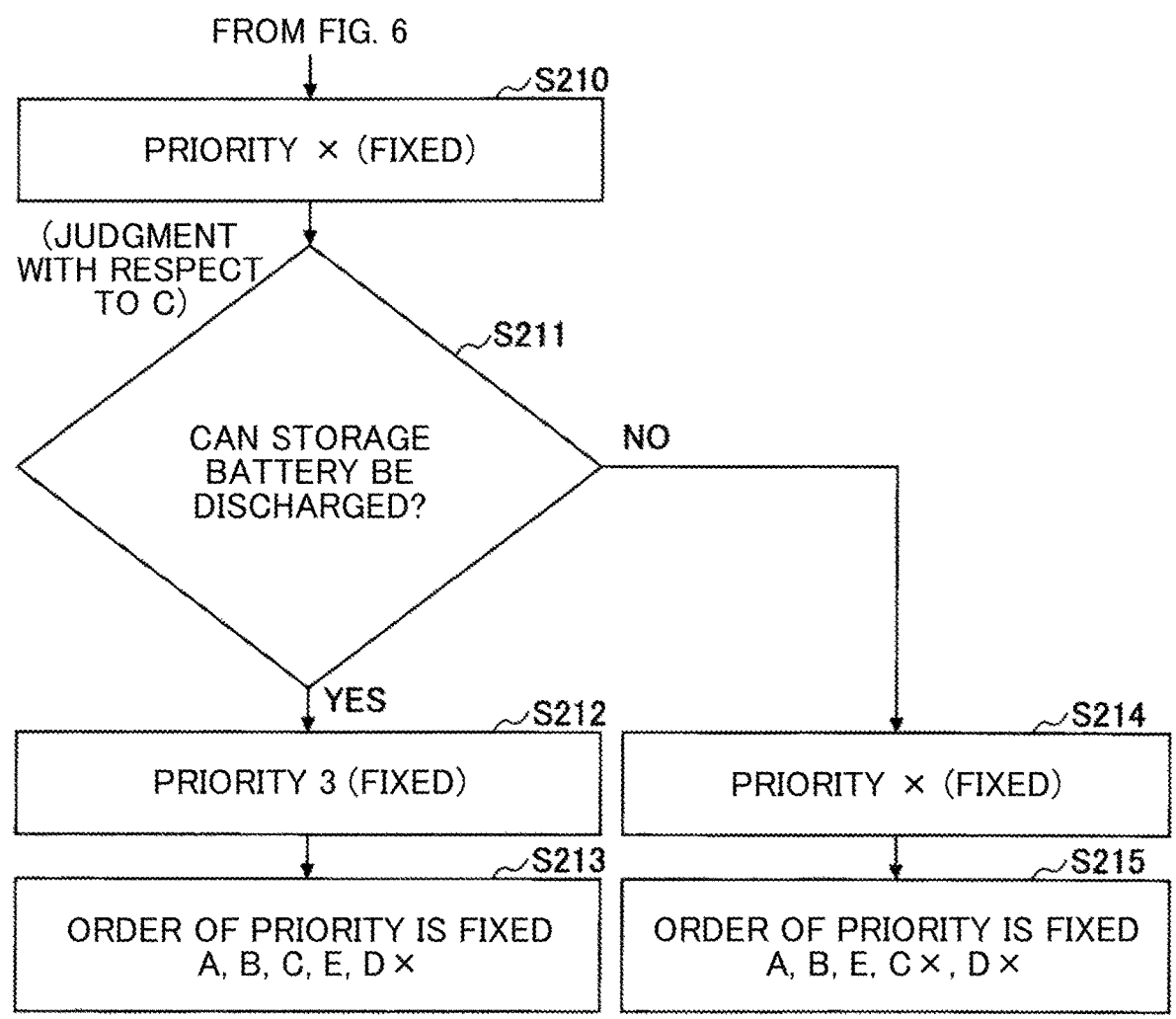
FIG. 7 shows an example of a flowchart for determining the order of priority.

If the result of judgment in S203 is No, the processing proceeds to S210 of FIG. 7, and the priority determination unit 140 determines that controlled object D (power distribution from another location) will not be used (indicated as Priority x in the figure). In S211, a judgment is made with respect to the controlled object C (power storage unit), and if the result of judgment is Yes, the order of priority "controlled object A (power generation unit)→controlled object B (load transfer)→controlled object C (power storage unit)→controlled object E (commercial power)" is fixed (S212 and S213). If the result of judgment in S211 is No, the order of priority "controlled object A (power generation unit)→controlled object B (load transfer)→controlled object E (commercial power)" is fixed (S214 and S215).

Figure 8:
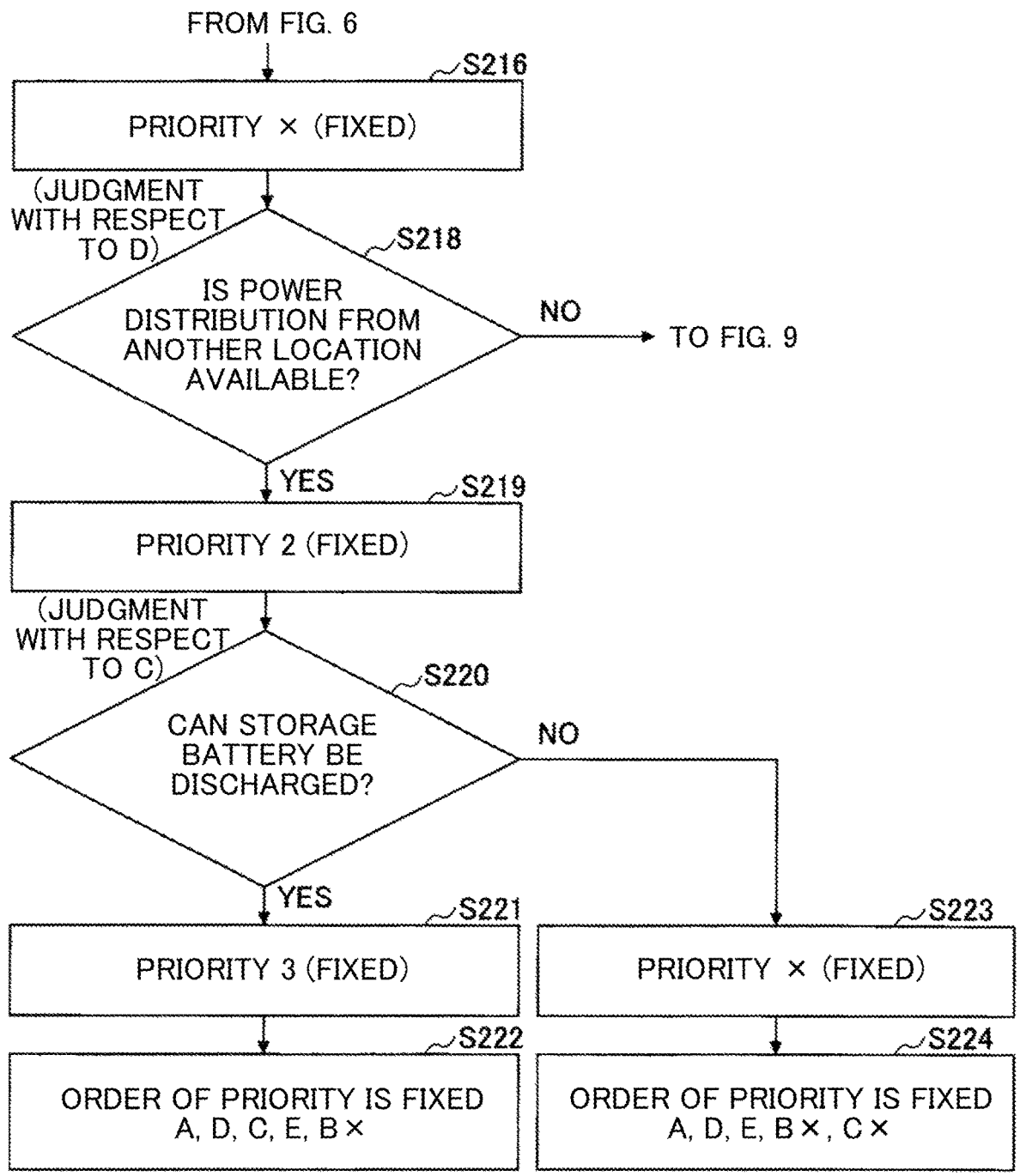
FIG. 8 shows an example of a flowchart for determining the order of priority.

If the result of judgment in S201 of FIG. 6 is No, the processing proceeds to S216 in FIG. 8, and if the results of judgment in S218 and S220 are both Yes, the order of priority "controlled object A (power generation unit)→controlled object D (power distribution from another location)→controlled object C (power storage unit)→controlled object E (commercial power)" is fixed (S219, S221 and S222). If the result of judgment in S220 is No, the order of priority "controlled object A (power generation unit)→controlled object D (power distribution from another location)→controlled object E (commercial power)" is fixed (S223 and S224).

Figure 9:
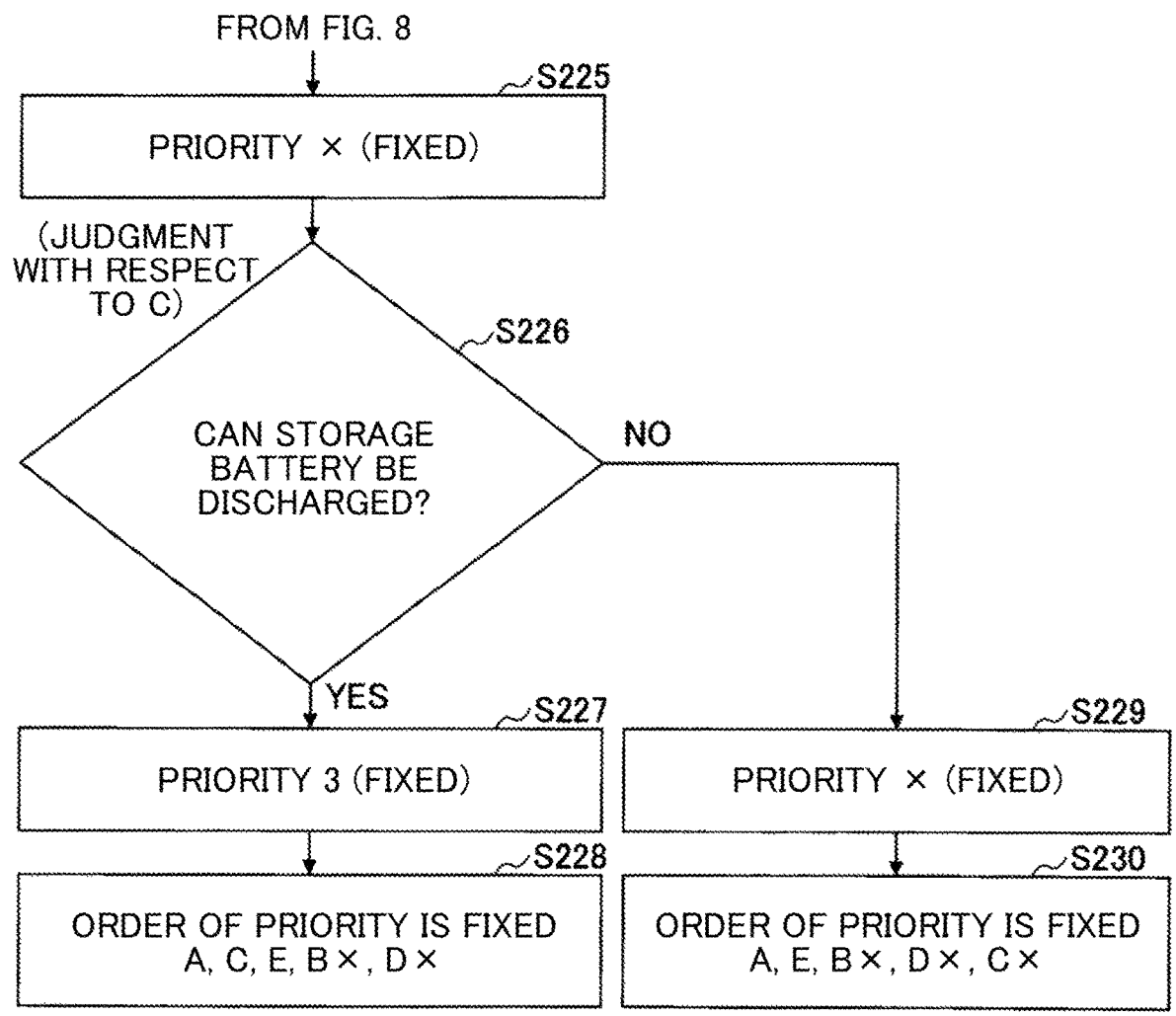
FIG. 9 shows an example of a flowchart for determining the order of priority.

If the result of judgment in S218 of FIG. 8 is No, the processing proceeds to S225 of FIG. 9, and if the result of judgment in S226 is Yes, the order of priority "controlled object A (power generation unit)→controlled object C (power storage unit)→controlled object E (commercial power)" is fixed (S227 and S228). If the result of judgment in S226 is No, the order of priority "controlled object A (power generation unit)→controlled object E (commercial power)" is fixed (S229 and S230). The results of judgment about the order of priority are written into the priority map, and reference is made thereto when setting is executed in S104. S102 and S103 of FIG. 4 are performed for each evaluation axis.

S104 of FIG. 4: Execution of Setting

In S104, the priority setting unit 150 sets, for the control unit at the target location, the order of priority that has been determined in S103 based on a certain evaluation axis. As for which evaluation axis the order of priority to be set is based on, for example, in the case where a user attaches priority to the cost, "cost" is input to the priority determination unit 150, and the order of priority that has been determined using cost as the evaluation axis is thus used.

As an example, the order of priority "controlled object A (power generation unit)→controlled object B (load transfer)→controlled object D (power distribution from another location)→controlled object C (power storage unit)→controlled object E (commercial power)" is set for the control unit. Moreover, here, it is assumed that priority control is performed based on voltage, and voltage values below (voltage values are merely examples) are set for the control unit together with the order of priority. In the case where priority control is performed based on current, current values can be set instead of the voltage values. Note that, in the following description, the location A is assumed to be the target location so that FIG. 1 can be referred to, and reference numerals shown therein are used.

The control unit 31A, which has received the setting from the power management apparatus 100, sets an output voltage of 400 V for the converter of the power generation unit 1A, an output voltage of 390 V for the converter for supplying power from another location to a portion within the target location, an output voltage of 385 V for the converter of the power storage unit 4A, and an output voltage of 380 V for the converter for supplying commercial power.

The control unit 31A is set so as to cause the consuming device 2A to transfer its load if the output voltage of the converter of the power generation unit 1A becomes 395 V or less.

Under this setting, a conductor with the highest voltage supplies power to the consuming device 2A, and therefore, usually, the power generation unit 1A supplies power to the consuming device 2A. If the control unit 31A detects that the output voltage of the converter of the power generation unit 1A becomes 395 V or less, the control unit 31A executes load transfer. If the output voltage of the converter of the power generation unit 1A becomes 390 V or less, power supply from the power generation unit 1A stops, and power supply from another location is started. If the output voltage of the converter for supplying power from the other location to a portion within the target location becomes 385 V or less, power supply from the other location stops, and power supply from the power storage unit 4A is started. If the output voltage of the converter of the power storage unit 4A becomes 380 V or less, power supply from the power storage unit 4A stops, and power supply of commercial power is started.

Note that a configuration may also be adopted in which the above-described functions of the control unit 31A are provided in the priority setting unit 150 of the power management apparatus 100, and the converter output voltage setting and the like are performed by the priority setting unit 150. In that case as well, the order of priority is set.

The above-described control can also be similarly performed as current-based control. As described above, control based on current values use converters that automatically control the voltage such that, if current values set for respective devices are changed, the changed current values can be achieved. Thus, more flexible and detailed control, such as allowing simultaneous power supply from a plurality of controlled objects and altering the ratio of power supply, can be performed.

Effects of Embodiment and Conclusion

As described above, according to the present embodiment, it is possible to effectively perform priority control with respect to power supply in a power system capable of power interchange between a plurality of locations. Moreover, since control over a plurality of locations is possible, priority control can be performed more efficiently.

The present specification describes at least the power management apparatus, priority control method, and program according to the following items.

(Item 1)
A power management apparatus for determining an order of priority with respect to power supply to a consuming device at a target location in a power system that includes a plurality of locations between which power can be interchanged,
the target location including at least the consuming device, a power generation unit that generates power from natural energy, a power storage unit, and a commercial power source,
the power management apparatus including:
a determination unit for determining, based on a predetermined evaluation axis, an order of priority among a plurality of controlled objects including at least power supply from the power generation unit, power supply from the power storage unit, power supply from the commercial power source, and power consumption reduction by transferring a load from the consuming device; and
a priority setting unit for setting the order of priority that has been determined by the determination unit for the target location.

(Item 2)
The power management apparatus according to item 1, wherein the plurality of controlled objects further include power supply through power interchange from another location.

(Item 3)
The power management apparatus according to item 1 or 2,
wherein the determination unit determines the order of priority by determining an order among the plurality of controlled objects based on the predetermined evaluation axis, and making a judgment for each controlled object on whether or not to use the controlled object, in the determined order.

(Item 4)
The power management apparatus according to any one of items 1 to 3,
wherein the predetermined evaluation axis is at least one of cost, loss, and disaster backup, and when the predetermined evaluation axis is the disaster backup, a high level of priority is assigned to charging the power storage unit.

(Item 5)
The power management apparatus according to any one of items 1 to 4,
wherein the priority setting unit sets the order of priority for the target location such that priority control based on a voltage value or priority control based on a current value is performed.

(Item 6)
A priority control method performed by a power management apparatus for determining an order of priority with respect to power supply to a consuming device at a target location in a power system that includes a plurality of locations between which power can be interchanged,
the target location including at least the consuming device, a power generation unit that generates power from natural energy, a power storage unit, and a commercial power source,
the method including:
a determination step of determining, based on a predetermined evaluation axis, an order of priority among a plurality of controlled objects including at least power supply from the power generation unit, power supply from the power storage unit, power supply from the commercial power source, and power consumption reduction by transferring a load from the consuming device; and
a priority setting step of setting the order of priority that has been determined in the determination step for the target location.

(Item 7)
A program for causing a computer to function as the units of the power management apparatus according to any one of items 1 to 5.

Although an embodiment has been described above, the present invention is not limited to this specific embodiment, and various modifications and changes can be made within the scope of the gist of the invention as described in the claims.

REFERENCE SIGNS LIST 1A, 1B Power generation unit
2A, 2B Consuming device
3A, 3B Power distribution unit
10A, 10B Power distribution grid 31A, 31B Measurement unit
100 Power management apparatus
110 Data storage unit
120 Order determination unit
130 Monitor unit
140 Priority determination unit
150 Priority setting unit
160 Input unit
200 Network
1000 Drive device
1001 Recording medium
1002 Auxiliary storage device
1003 Memory device
1004 CPU
1005 Interface device
1006 Display device
1007 Input device
1008 Output device

The invention claimed is:

1. A power management apparatus configured to determine an order of priority with respect to power supplied to a consuming device at a target location in a power system that includes a plurality of locations between which power is interchanged,
wherein the target location includes at least the consuming device, a power generation unit that generates power from natural energy, a power storage unit, and a commercial power source,
wherein the power management apparatus comprises:
a determination unit, comprising one or more processors, configured to determine, based on a predetermined evaluation axis, an order of priority among a plurality of controlled objects including at least power supply from the power generation unit, power supply from the power storage unit, power supply from the commercial power source, and power consumption reduction by transferring a load from the consuming device; and
a priority setting unit, comprising one or more processors, configured to set the order of priority determined by the determination unit for the target location.

2. The power management apparatus according to claim 1, wherein the plurality of controlled objects include power supplied through power interchange from another location.

3. The power management apparatus according to claim 1, wherein the determination unit is configured to determine the order of priority by determining an order among the plurality of controlled objects based on the predetermined evaluation axis, and producing a judgment for each controlled object on whether or not to use the controlled object, in the determined order.

4. The power management apparatus according to claim 1,
wherein the predetermined evaluation axis comprises at least one of cost, loss, and disaster backup, and
wherein when the predetermined evaluation axis is the disaster backup, a level of priority for charging the power storage unit is increased.

5. The power management apparatus according to claim 1, wherein the priority setting unit is configured to set the order of priority for the target location such that priority control based on a voltage value or priority control based on a current value is performed.

6. A priority control method performed by a power management apparatus configured to determine an order of priority with respect to power supplied to a consuming device at a target location in a power system that includes a plurality of locations between which power is interchanged,
wherein the target location includes at least the consuming device, a power generation unit configured to generate power from natural energy, a power storage unit, and a commercial power source,
wherein the method comprises:
determining, based on a predetermined evaluation axis, an order of priority among a plurality of controlled objects including at least power supply from the power generation unit, power supply from the power storage unit, power supply from the commercial power source, and power consumption reduction by transferring a load from the consuming device; and
setting the order of priority for the target location.

7. A non-transitory, computer-readable medium storing one or more instructions executable by a computer system to perform operations by a power management apparatus comprising:
determining, based on a predetermined evaluation axis, an order of priority among a plurality of controlled objects including at least power supply from a power generation unit configured to generate power from natural energy, power supply from a power storage unit, power supply from a commercial power source, and power consumption reduction by transferring a load from a consuming device; and
setting the order of priority for a target location,
wherein the target location including at least the consuming device, the power generation unit, the power storage unit, and the commercial power source.

* * * * *